(12) United States Patent
Soprano-Joseph et al.

(10) Patent No.: US 10,475,296 B1
(45) Date of Patent: Nov. 12, 2019

(54) HYBRID CASH RECYCLER

(71) Applicant: JPMorgan Chase Bank, N.A., New York, NY (US)

(72) Inventors: Kailey Soprano-Joseph, Columbus, OH (US); Giancarlo Miranda, Columbus, OH (US); Jennifer Teitt, Columbus, OH (US); William Budde, Dublin, OH (US); Jordan Markward, Columbus, OH (US); Joseph Bradley Nolan, New Albany, OH (US); Michael A. Bradley, Newark, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 353 days.

(21) Appl. No.: 14/978,561

(22) Filed: Dec. 22, 2015

Related U.S. Application Data

(60) Provisional application No. 62/098,111, filed on Dec. 30, 2014.

(51) Int. Cl.
*G07G 1/12* (2006.01)
*G06Q 20/40* (2012.01)

(52) U.S. Cl.
CPC ............. *G07G 1/12* (2013.01); *G06Q 20/405* (2013.01)

(58) Field of Classification Search
CPC ........ G07G 1/12; G06Q 20/405; G06Q 20/40; G06Q 20/401; G07F 19/202; G07F 19/203
See application file for complete search history.

(56) References Cited

U.S. PATENT DOCUMENTS

| | | | | | |
|---|---|---|---|---|---|
| 4,614,861 | A | * | 9/1986 | Pavlov | G06K 19/07 235/375 |
| 6,116,402 | A | * | 9/2000 | Beach | G07F 7/005 194/216 |
| 6,896,118 | B2 | * | 5/2005 | Jones | G07D 3/16 194/217 |
| 6,923,371 | B2 | * | 8/2005 | Goodfellow | G06Q 20/4012 235/380 |
| 7,175,073 | B2 | * | 2/2007 | Kelley | G06Q 20/1085 235/379 |
| 7,716,129 | B1 | * | 5/2010 | Tan | G06Q 20/02 705/35 |
| 8,047,427 | B2 | * | 11/2011 | Sanders | G07F 19/202 235/379 |

(Continued)

*Primary Examiner* — Kenneth Bartley
(74) *Attorney, Agent, or Firm* — Hunton Andrews Kurth LLP (57) ABSTRACT

Exemplary embodiments include a hybrid cash recycler device that provides cash handling and extended capabilities for use within a financial institution. The hybrid cash recycler may be configured to support wireless communications with multiple distributed computing devices in a financial institution branch. The wireless connectivity may provide portable command and control capabilities for the hybrid cash recycler. The hybrid cash recycler may be configured to employ queuing mechanisms, in a manner that allows the device to systematically arrange and execute multiple command requests initiated from several computing devices. The hybrid cash recycler may require user authentication prior to completing cash handling services. Upon a successful authentication, requested cash handling services may be completed.

10 Claims, 5 Drawing Sheets

(56) References Cited

U.S. PATENT DOCUMENTS

| Patent/Publication | Date | Inventor | Classification |
|---|---|---|---|
| 8,065,226 B2 * | 11/2011 | Rizzo | G06Q 20/10 705/35 |
| 8,181,854 B1 * | 5/2012 | Folk | G06Q 30/0267 235/375 |
| 8,214,257 B1 * | 7/2012 | Folk | G06Q 20/20 235/379 |
| 8,364,589 B2 * | 1/2013 | Rizzo | G06Q 20/10 705/35 |
| 8,407,145 B1 * | 3/2013 | Banaugh | G06Q 20/10 705/39 |
| 8,517,257 B1 * | 8/2013 | Folk | G07F 19/207 235/379 |
| 8,554,672 B1 * | 10/2013 | Rizzo | G06Q 20/10 705/35 |
| 8,756,162 B2 * | 6/2014 | Brunet | G06Q 20/00 705/24 |
| 8,812,366 B2 * | 8/2014 | Folk | G06Q 20/10 235/379 |
| 9,141,876 B1 * | 9/2015 | Jones | G06K 9/60 |
| 9,536,240 B2 * | 1/2017 | Raja | G06Q 20/385 |
| 9,558,418 B2 * | 1/2017 | Jones | G06K 9/60 |
| 10,032,155 B2 * | 7/2018 | Hagemann | G06F 21/36 |
| 10,163,023 B2 * | 12/2018 | Jones | G06K 9/60 |
| 2002/0069170 A1 * | 6/2002 | Rizzo | G06Q 20/10 705/43 |
| 2003/0046231 A1 * | 3/2003 | Wu | G06Q 20/04 705/43 |
| 2003/0127299 A1 * | 7/2003 | Jones | G07D 3/16 194/217 |
| 2004/0139014 A1 * | 7/2004 | Song | G06Q 20/04 705/40 |
| 2006/0200410 A1 * | 9/2006 | Kelley | G06Q 20/1085 705/43 |
| 2007/0038516 A1 * | 2/2007 | Apple | G06Q 30/02 705/14.42 |
| 2007/0235523 A1 * | 10/2007 | Clements | G06Q 20/06 235/379 |
| 2009/0319425 A1 * | 12/2009 | Tumminaro | G06Q 20/108 705/42 |
| 2009/0320106 A1 * | 12/2009 | Jones | G06Q 20/1085 726/5 |
| 2010/0025183 A1 * | 2/2010 | Folk | G07D 11/006 194/200 |
| 2010/0049659 A1 * | 2/2010 | Cassone | G06F 21/32 705/64 |
| 2010/0066491 A1 * | 3/2010 | Bohen | G07D 11/0009 340/5.51 |
| 2010/0082443 A1 * | 4/2010 | Folk | G06Q 20/10 705/16 |
| 2010/0127070 A1 * | 5/2010 | Sanders | G07F 19/20 235/379 |
| 2010/0131374 A1 * | 5/2010 | Sanders | G06Q 20/20 705/16 |
| 2010/0168903 A1 * | 7/2010 | Aas | G07D 11/0009 700/214 |
| 2010/0236996 A1 * | 9/2010 | Folk | B07C 5/3422 209/534 |
| 2011/0016048 A1 * | 1/2011 | Lindqvist | G06Q 20/0425 705/44 |
| 2011/0238573 A1 * | 9/2011 | Varadarajan | G06Q 20/1085 705/43 |
| 2011/0281630 A1 * | 11/2011 | Omar | G06F 21/33 463/17 |
| 2011/0307379 A1 * | 12/2011 | Fujita | G06Q 20/1085 705/43 |
| 2011/0308913 A1 * | 12/2011 | Doi | G07D 1/00 194/216 |
| 2011/0320351 A1 * | 12/2011 | Rizzo | G06Q 20/10 705/43 |
| 2013/0091058 A1 * | 4/2013 | Huster | G06Q 20/322 705/44 |
| 2014/0019353 A1 * | 1/2014 | Henderson | G06Q 20/1085 705/42 |
| 2014/0032345 A1 * | 1/2014 | Moore | G06Q 20/3226 705/18 |
| 2014/0095383 A1 * | 4/2014 | Rao | G06Q 20/383 705/43 |
| 2014/0263618 A1 * | 9/2014 | McCarthy | G06Q 40/02 235/379 |
| 2014/0316994 A1 * | 10/2014 | Hagemann | G06F 21/36 705/75 |
| 2014/0344157 A1 * | 11/2014 | Suitner | G06Q 20/383 705/44 |
| 2014/0351125 A1 * | 11/2014 | Miller | G06Q 20/1085 705/43 |
| 2015/0087408 A1 * | 3/2015 | Siemasko | G07F 17/3251 463/25 |
| 2015/0095219 A1 * | 4/2015 | Hurley | G06Q 20/325 705/39 |
| 2015/0356366 A1 * | 12/2015 | Jones | G06K 9/60 382/135 |
| 2016/0019537 A1 * | 1/2016 | Raja | G06Q 20/385 705/43 |
| 2016/0098904 A1 * | 4/2016 | Choudhury | G07F 19/203 705/43 |
| 2017/0098134 A1 * | 4/2017 | Jones | G06K 9/60 |
| 2017/0262823 A1 * | 9/2017 | Hartung | G07F 19/20 |
| 2018/0204194 A1 * | 7/2018 | Folk | G07F 19/20 |

* cited by examiner

HYBRID CASH RECYCLER

CROSS-REFERENCE TO RELATED APPLICATIONS

This application claims the benefit of U.S. Provisional Application No. 62/098,111, filed Dec. 30, 2014. The contents of which are hereby incorporated by reference in their entirety.

BACKGROUND

Automated cash handling is the process of employing dedicated machines to perform traditionally manual cash management activities. Financial institution personnel, for example bank tellers, in many situations, perform actions involving the handling of large amounts of cash by hand such as cash counting, cash distributing, cash sorting, and the like. There are drawbacks associated with manually performing these actions such as time and resource constraints to complete, exposure to theft, ineffective fraud detection, and errors (e.g., miscounting).

Existing teller cash recycler (TCR) devices are designed to directly connect to one or two adjacent teller workstations using cables or other physical connectors, such as serial ports, Universal Serial Bus (USB) connections, etc. Therefore, it is necessary for multiple TCR devices to be employed in larger financial institutions with many customer service employees. Situations arise where portable electronic devices may be used by financial institution personnel to service customers "on the floor" of the branch. Current TCR devices are not configured to support communication with remotely located devices. Therefore, conventional automated cash handling devices, such as TCR devices, are limited by wired network connectivity and restricted communication capabilities.

These and other deficiencies exist.

SUMMARY

An exemplary embodiment includes a system having: a wireless communications network; one or more computing devices communicatively coupled to the wireless communications network, wherein one or more transaction requests are initiated by the one or more computing devices; a server communicatively coupled to the wireless communications network, wherein the server receives the one or more transaction requests via the wireless communications network and queues the one or more transaction requests; and an automated cash handling device, having: a wireless interface communicatively coupled to the wireless communications network, wherein the wireless interface establishes wireless communication connections with the one or more computing devices and receives one or more transaction requests from the queue; an interface for receiving a selection of one of the one or more transaction requests in the queue and an authentication input from a user; a processor, wherein the processor determines whether the authentication input matches an authentication code received with the one or more transaction requests; and one or more cash handling components, wherein the one or more cash handling components perform the one or more transaction requests based upon a successful determination of the authentication input matching the authentication code.

Another exemplary embodiment includes an apparatus, having: a wireless interface communicatively coupled to a wireless communications network, wherein the wireless interface establishes wireless communication connections with the one or more computing devices and receives one or more transaction requests; an input device for receiving a selection of one or the one or more transaction requests and for receiving an authentication input entered by a user; a processor, wherein the processor determines whether the authentication input matches an authentication code received via the wireless communication connections; and one or more cash handling components, wherein the one or more cash handling components perform the one or more transaction requests based upon a successful determination of the authentication input matching the authentication code.

Another exemplary embodiment includes an method including the steps of: initiating, by one or more computing devices, one or more transaction requests; establishing, by the cash handling device, wireless communication connections with the one or more computing devices; receiving, by a server, the one or more transaction requests via a wireless communication network; queuing, by the server, the one or more transaction requests; receiving, by the automated cash handling device, one or more transaction requests transmitted via the wireless communication network; receiving, by the cash handling device, one or more authentication codes transmitted via the wireless communication connections with the one or more computing devices; receiving, by the cash handling device, from a user, a selection of one or the one or more transaction requests and an authentication input; determining, by the cash handling device, the authentication input matches at least one or the one or more authentication codes; and performing, by the cash handling device, one or more transaction requests.

These and other embodiments and advantages of the preferred embodiments will become apparent from the following detailed description, taken in conjunction with the accompanying drawings, illustrating by way of example the principles of the various embodiments.

DETAILED DESCRIPTION

It will be readily understood by those persons skilled in the art that the various embodiments described herein are capable of broad utility and application.

Exemplary methods are provided by way of example herein, as there are a variety of ways to carry out the method disclosed herein. The methods depicted in the Figures may be executed or otherwise performed by one or a combination of various systems, such as described herein. Each block shown in the Figures represents one or more processes, methods, and/or subroutines carried out in the exemplary methods. Each block may have an associated processing machine or the blocks depicted may be carried out through one processor machine. Furthermore, while the steps may be shown in a particular order, it should be appreciated that the steps may be conducted in a different order.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read-only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer-based network. The computers may have software installed thereon configured to execute the methods of the exemplary embodiments. The software may be in the form of modules designed to cause a computer processor to execute specific tasks. The software may be stored on a tangible, non-transitory computer-readable medium. The computers may be configured with hardware to execute specific tasks. As should be appreciated, a variety of computer-based configurations are possible.

A teller cash recycler (TCR) is an automated cash handling device that conducts particular cash handling tasks including, but not limited to, withdrawals, deposits, and exchanges. The use of TCR or cash recycler device herein, may include, but is not limited to, machines, kiosks, and stations for performing financial services transactions.

Various embodiments provide automated cash handling that allows personnel, who otherwise dedicated time and attention to tedious manual cash handling activities, to redirect attention to other customer service tasks. Accordingly, employing automated cash handling devices improves productivity and overall branch management. Automated cash handling devices provide other benefits such as increased accuracy, increased efficiency, and reduced cash exposure in the banking environment which leads to reduced opportunities for theft and fraud. Improved customer service results from the automated cash handling.

Figure 1:
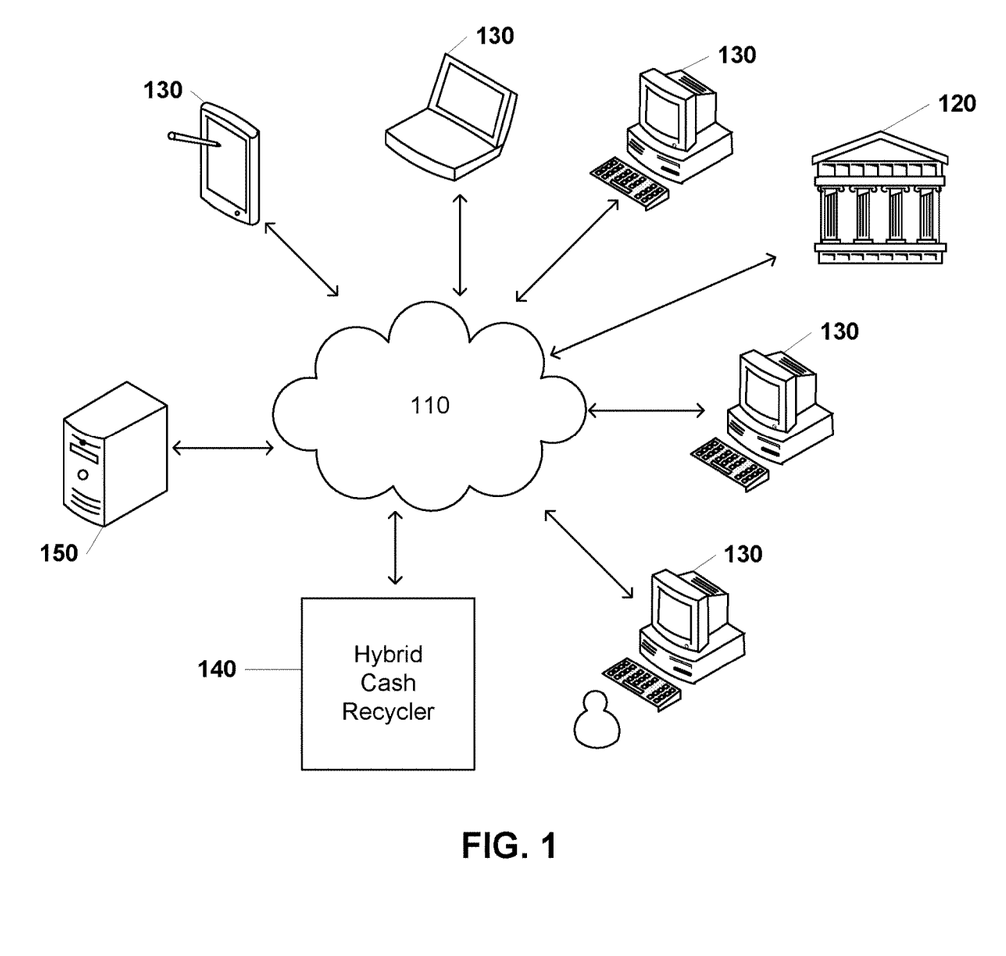
FIG. 1 is a diagram of a system in accordance with an exemplary embodiment.

FIG. 1 is a system according to exemplary embodiments. The system 100 may provide various functionality and features of the hybrid cash recycler. Furthermore, according to an embodiment, the system 100 may be provided by a financial institution 120, such as bank branches, according to an embodiment. More specifically, the system 100 depicts the hardware configuration of devices within the financial institution 120. The system may include a communications network 110, one or more teller workstations 130, a hybrid cash recycler device 140, and a bank server 150.

According to an embodiment, the hybrid cash recycler device 140 may be connected to a communications network 110. The communications network 110 may be a computer-based network that is established, or otherwise made available within the financial institution 120. The communication network may include one or more servers and/or computer processors. For example, the network may be a wide area network (WAN), for example the Internet or a network connected to the Internet. The network may be a satellite or cellular-based network. Information and data may be exchanged through the network between the various devices. Furthermore, the communications network may be a local area network (LAN), such as an intranet. It should be appreciated that the network may be a combination of local area networks, wide area networks, and external networks, which may be connected to the Internet.

In accordance with exemplary embodiments, a plurality of teller workstations 130 may be connected to communications network 110. Each teller workstation 130 may be a banker facing asset which allows one or more employees of the financial institution to perform a plurality of administrative, banking, and/or customer service functions from the workstation. The teller workstation 130 may be a personal computer such as desktop computer, running software which facilitates cash handling transactions with the hybrid cash recycler 140. The teller workstation 130 may be used to control and/or communicate with other teller automation devices communicatively coupled to the communications network 110.

According to an embodiment, the software may be conventional teller connectivity applications and/or banking application suites, such as "Teller Express" that may be installed on the workstation. The application suite and platform may support and enable operations and servicing of cash handling devices, such as the hybrid cash recycler 140. In this embodiment, software on the teller workstation 130 may provide an interface that allows the user to perform a wide variety of transactions for customers, such as accepting deposits, distributing funds, accepting checks, transferring money between accounts, making payments on loans, performing account inquiries, etc. Additional devices may be either wired or wireless coupled to the teller workstation 130 in order perform various functions. For example, a Magnetic Ink Character Recognition (MICR) reader may be connected to the teller workstation which enables the scanning of encoded checks.

According to an embodiment, the teller workstation 130 may be one or more portable financial data processing platforms or portable electronic devices. In an exemplary embodiment, portable electronic devices may be employed by the financial institution 120 for use by financial institution employees to provide traditional teller functions in areas of the branch such as "on the floor," that are not limited to the teller line. Each teller workstation 130 may be a portable electronic device or mobile electronic device. The portable electronic device may have communication capabilities over cellular, wireless, and/or wired type networks to transmit/receive data and/or voice communications.

The portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM)-based systems, Code Division Multiple Access (CDMA)-based systems, Transmission Control Protocol/Internet Protocols (TCP/IP), or other protocols and/or systems suitable for transmitting and receiving data from the portable electronic device. The portable electronic device may use standard wireless protocols which may include IEEE 802.11a, 802.11b, 802.11g, 802.11n, Near-Field Communications, and Bluetooth. Certain portable electronic devices may be Global Positioning System (GPS) capable. Other location systems may be used. The portable electronic device may include one or more computer processors and be capable of being programmed to execute certain tasks.

Each teller workstation 130 may have a log-in associated therewith. The log-in may be used to allow access to the device. The log-in may require a particular input or it may accept a combination of inputs. The input may serve as an authentication of the user to the workstation and, in some embodiments, the system 100 in general. Various authentication or log-on systems and methods may be used. For example, these methods and systems may include entering a password or Personal Identification Number (PIN) or using a card to logon, either via swiping the card through a reader, such as a magnetic stripe reader or a smart chip reader, or through a radio frequency system (which may require that the card be placed in proximity to an appropriate reader (e.g., a contactless system), such as, for example, Radio Frequency Identification (RFID) or Near Field Communications (NFC). It should be appreciated that the card may include a combination of a magnetic strip, a smart chip, and radio frequency. Further, the use of the card is exemplary only and the card may include fobs, stickers, and other devices. Biometrics may be used, such as fingerprints, facial recognition, speech recognition, palm vein scan, or retinal scan. A combination of these systems may be used. Biometrics may be used in addition to other log-in methods and systems.

Bank server 150 may be interconnected to one or more hybrid cash recyclers 140, and/or one or more teller workstations 130 via network 110. The bank server 150 may be an application server and/or a database server, for example. In an embodiment, the bank server may provide access to applications used by the one or more hybrid cash recyclers 140, and/or the teller workstations 130 located within the financial institution 120. Through the communications network 110, each of the teller workstations 130 may have access to the applications and databases residing on the bank server 150. As will be described below, transaction requests (e.g., deposit, withdrawal, etc.) generated from each teller workstation 130 may be received by the bank server 150 for subsequent processing. Additionally, the transaction requests may be transmitted from the bank server 150 to the hybrid cash recycler 140 for completion.

According to an embodiment, the bank server 150 may process instructions for queuing a plurality of transaction requests that are transmitted from one or more teller workstations 130. Thereafter, the bank server 150 may route the transaction requests, initiated by the teller workstation 130, to be performed by the hybrid cash recycler 140. The bank server 150 may queue and transmit the transaction requests in the same order received from the teller workstations 130, for example according to First-In-First-Out (FIFO) mechanisms.

Alternatively, the bank server may queue and transmit the transaction requests opposite of the order received, for example according to Last-In-First-Out (LIFO) mechanisms. In another embodiment, the bank server 150 may further arrange the transaction requests to be queued, and subsequently transmitted, in an order which corresponds to a priority assigned to each transaction request.

The bank server 150 may include a memory device, such as a database, that maintains multiple attributes associated with the one or more received transaction requests. The transaction request attributes may include, but are not limited to, the transaction type (e.g., withdrawal, deposit, transfer, etc.), denominations (e.g., $1, $5, $20, etc.), cash amount, teller ID, location, time, and the like. According to various embodiments, the bank server 150 may store a list of transaction request identifiers that have been assigned to each transaction request received. Each transaction request identifier may uniquely identify an associated transaction request. The bank server 150 may store the transaction request identifier in the same, or related, memory address location as the transaction request. Furthermore, the transaction request and the transaction request identifier may be accessible for performing authenticated transactions at the hybrid cash recycler 140.

In an exemplary embodiment, the bank server 150 may store a specified authentication code that corresponds to a particular teller workstation 140, or financial institution employee, that generated the transaction request. Alternatively, the bank server 150 may store an authentication that corresponds to the particular transaction request. For example, each transaction request generated may be associated with a separate and unique authentication code. The authentication code may be initially received by the teller workstation 140, and transmitted to the bank server 150. For example, a banking application running at the teller workstation 130 may prompt the user to input an authentication code upon generation of a transaction request.

In some embodiments, the bank server 150 may randomly generate an authentication code to assign to a received transaction request. The authentication code may be pseudo-random or random. According to various embodiments, the authentication stored by the bank server 150 may be a code, a password, a PIN number, alpha-numeric sequence, biometric data, a token, or other supplied credentials. According to various embodiments, the bank server 150 may hold a queued transaction request until a user enters data, such as a PIN, at the hybrid cash recycler 140 that matches the stored authentication code for the corresponding transaction request identifier. Thereafter, the bank sever 150 may transmit the corresponding transaction request to be performed by the hybrid cash recycler 140.

In exemplary embodiments, one or more hybrid cash recycler devices 140 may be provided. The hybrid cash recycler 140 may be employed to perform financial transactions, such as dispensing and accepting cash, as directed by the applications executed by the teller workstation 130. The hybrid cash recycler 140 may be configured to wirelessly receive commands and/or transaction requests from one or more remotely located teller workstations 130. Specifically, the teller workstations 130 control the transactions performed using the hybrid cash recycler 140. For example, a financial institution employee (e.g., a teller) may use an application installed on the teller workstation device, such as Teller Express, to initiate the transaction request to withdraw $10,000 from the hybrid cash recycler 140. Subsequently, the transaction may be queued until the financial institution employee physically interacts with the hybrid cash recycler 140 for authentication to complete the transaction and dispense the requested amount of cash.

According to various embodiments, the hybrid cash recycler 140 may provide wired networking capabilities via a wired network interface. The wired network interface may support a number of different connections for wired, or direct, networking such as serial RS232 ports, USB ports, and Ethernet ports. Wired network connections may further support communication and/or control of the hybrid cash recycler 140 from one or more teller workstations 130. For instance, the hybrid cash recycler 140 may form a direct communications connection, such as a point-to-point (P2P) network, with an adjacently positioned teller workstation 130. Thereafter, the teller workstation 130 may communicate and/or control the hybrid cash recycler 140 located within the financial institution 120, for instance in a teller line.

In various embodiments, the hybrid cash recycler 140 may include a wireless network interface that enables wireless connectivity, and thereby expanding the communication capabilities of the device. The hybrid cash recycler 140 may be configured to support wireless connectivity to one or more teller workstations 130 via the communications network 110. In accordance with exemplary embodiments, the hybrid cash recycler 140 may include a wireless adapter and/or wireless card (e.g., PCI, PCMCIA, etc.). In other embodiments, the hybrid cash recycler 140 may employ other conventional forms of wireless network interfaces, such as wireless modems, wireless antennas, wireless transceivers, USB wireless adapters, etc. It should be appreciated that any combination of wireless and wired network interfaces may be used.

Each of the devices 130, 140, and 150 may establish communications with other parts of the system 100 over the network 110 as described above. Upon successful initiation of communications between the network 110 and another part of the system 100, data may be exchanged between the various devices.

The devices 130, 140, and 150 may be geographically dispersed. Conversely, two or more of devices 130, 140, and 150 may be located in close proximity. For example, the devices may be located within or near a branch office of the financial institution. Wherever the location of the device 130, 140, and 150, it may still be able to communicatively couple with the network 110 and the components of the system 100.

Figure 2:
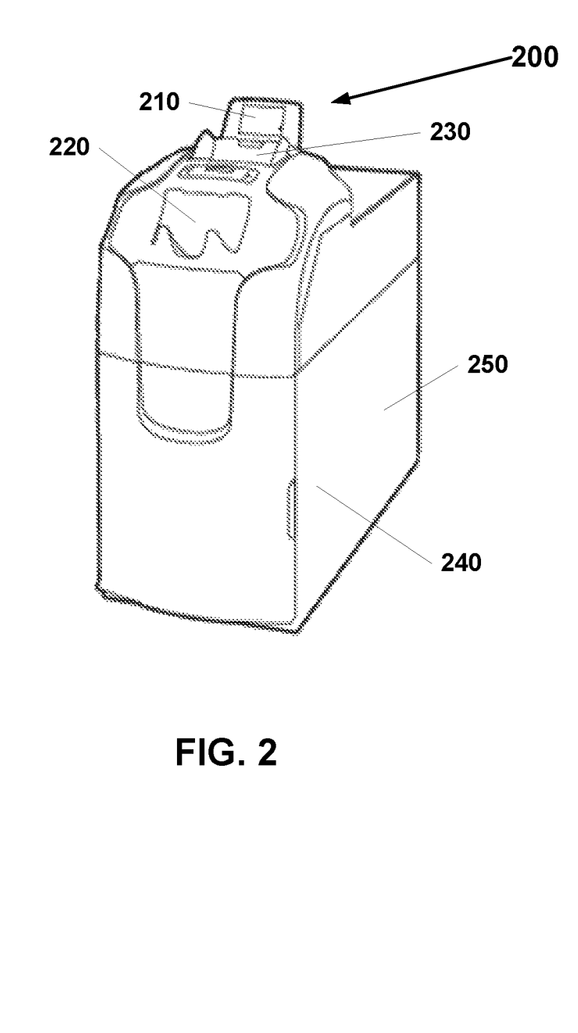
FIG. 2 is a depiction of an exterior view of a hybrid cash recycler device in accordance with an exemplary embodiment.

FIG. 2 depicts an exterior view of a hybrid cash recycler device 200 in accordance with an exemplary embodiment. Components of the hybrid cash recycler 200 may include a display 210, an input hopper 220, and an output hopper 230.

The hybrid cash recycler 200 may be configured to operate in various financial environments such as financial institutions, banking branches, retail stores, check cashing establishments, etc. In an embodiment, the hybrid cash recycler device 200 may be located in the system 100 of FIG. 1. The hybrid cash recycler 200 may be located at a teller line counter, for example, within the financial institution. The teller line counter may designate a specified financial employee area which physically separates banker facing assets (e.g., teller cash recyclers, teller cash dispensers, teller workstations) from customer facing assets (e.g., ATM) that may be located in a designated customer area.

The display 210 may be any screen or visual interface, such as a touch screen, that provides data and/or messages to direct access to teller functions. In an embodiment, the display 210 may present information regarding transactions requests for viewing by the user. Exemplary information presented by display 210 may include, but is not limited to, amount of currency deposited/withdrawn, the type of transaction, currently queued transaction requests, completed transactions, transaction identification information, transaction errors, etc. The display 210 may be used by the financial institution employee as a user interface to enter authentication data, for example a PIN, at the hybrid cash recycler 200. The display 210 may be monochrome or color. For example, the display 210 may be a plasma, liquid crystal, or cathode ray tube type display.

An input hopper 220 may be employed to receive cash, such as banknotes, bills, paper money, or notes, at the hybrid cash recycler device 200. According to an embodiment, a financial institution employee, for example a teller, may place multiple banknotes of the same or varying denominations (e.g., $1, $5, $10, $20, $50, etc.) into the input hopper 220 for deposit into the hybrid cash recycler 200. Additional hardware components, for example motorized belts, may be used to feed or otherwise automatically transfer banknotes from the input hopper 230 to various other hardware or software components of the hybrid cash recycler 200. These components may perform operations such as counting, sorting, authenticating, and storing of the deposited banknotes, inserted at the input hopper 230.

An output hopper 230 may be employed to dispense cash, such as banknotes, at the hybrid cash recycler device 200. In an exemplary embodiment, a teller may specify a particular currency (e.g., amounts, denominations, etc.) for withdrawal from the hybrid cash recycler 200. The hybrid cash recycler 200 may use additional hardware components to retrieve or otherwise automatically transfer the appropriate banknotes from various components of the hybrid cash recycler 200. For instance, previously deposited banknotes may be stored in hybrid cash recycler 200 compartments, such as cassettes and/or roller storage modules. The hybrid cash recycler 200 hardware and/or software may determine specific banknotes to retrieve for withdrawal. The hybrid cash recycler 200 may further operate to move the retrieved banknotes from storage to the output hopper 230 for dispensing to a teller, for example.

FIG. 2 depicts an external view of the hybrid cash recycler 200 storage components. Specifically, the hybrid cash recycler 200 may include one or more roller storage modules (RSMs). The RSMs may be internal to the hybrid cash recycler 200. The RSMs may be configured to separately store and organize specific denominations of banknotes within the hybrid cash recycler 200. In some embodiments, each banknote denomination may be assigned to one corresponding RSM. For example, $1 and $5 banknotes may each be stored in one RSM, respectively. In another embodiment, more than one RSM compartment may be assigned to a specific denomination. In this instance, $1 banknotes may be stored in multiple RSMs. This particular embodiment may be advantageous in financial environments where large volumes of cash are handled and subsequently stored.

The hybrid cash recycler 200 may include one or more cassettes, which hold any additional currency that may be accepted or otherwise deposited. The cassettes may be internal to the hybrid cash recycler 200. According to an embodiment, the hybrid cash recycler 200 may receive a plurality of banknotes, for example cash deposited using input hopper 220 and transferred to the RSMs. Thereafter, in the event that one or more of the RSMs become full, any excess banknotes that are not held in the RSMs may be stored in the cassettes. In some embodiments, the cassettes may be employed for storage of banknotes that are determined to be unsuitable for the in-branch recycling or circulation, such as counterfeit, damaged, or unrecognizable cash. The hybrid cash recycler 200 may process and retrieve banknotes stored in the cassettes for re-use, or recycling, in the conducted financial transactions (e.g., withdrawals, exchanges, etc.).

Figure 3:
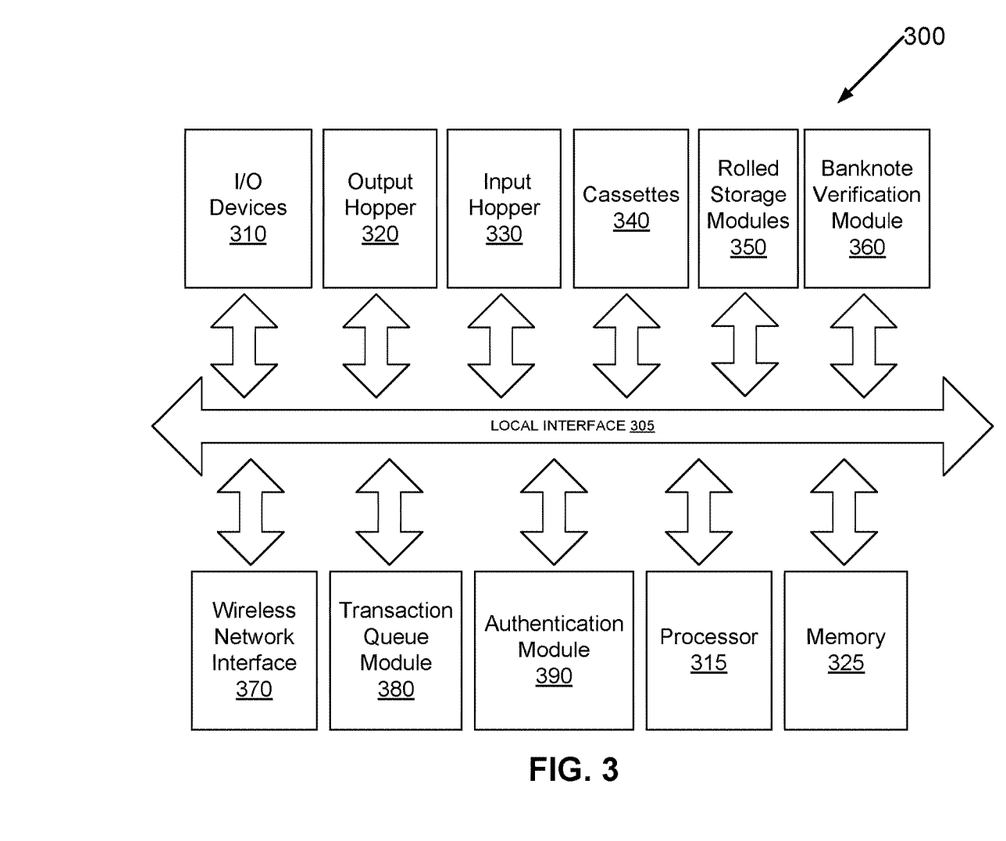
FIG. 3 is a depiction of internal components of a hybrid cash recycler device in accordance with an exemplary embodiment.

FIG. 3 depicts an exemplary hardware and software configuration of a hybrid cash recycler 300 according to exemplary embodiments.

The hybrid cash recycler 300 may include one or more input/output devices 310 that are capable of receiving and/or outputting information. In an embodiment, the input/output devices 310 may include a display and an input device. The input/output device 310 may be a single device or a combination of devices.

The display may be monochrome or color. For example, the display may be a plasma, liquid crystal, or cathode ray tube type display. The display may be a touch screen type display. The hybrid cash recycler 300 may have more than one display. The multiple displays may be different types of displays. The display may have sub-displays thereon. For example, the display may have a large display surface. The display for the user interface may occupy a portion or less than the whole of the large display surface.

Input devices may include a keyboard, which can be a full-sized QWERTY keyboard or a condensed keyboard. Input devices may further include a numeric pad, an alphanumeric pad, a trackball, a touchpad, a mouse, and/or fixed selection buttons. As described above, the display may serve as an input device through using or incorporating a touch-screen interface.

In some embodiments, the input/output devices 310 may include one or more cameras, optical sensors, or other sensing devices.

An output hopper 320 may support cash dispensing functions, such as withdrawal, for the hybrid cash recycler 300. The output hopper 320 may have a maximum capacity of banknotes that may be simultaneously dispensed. For example, 150 banknotes may be the capacity. According to various embodiments, the output hopper 320 may be cleared by removing the cash, in order to continue uninterrupted dispensing of banknotes for withdrawals that may be larger than the maximum capacity. The output hopper 320 may have a maximum speed at which the banknotes are dispensed. As an example, 6 notes per second may be the speed. In an embodiment, the output hopper 320 may have capabilities to support sorting of the banknotes.

The hybrid cash recycler 300 may include an input hopper 330. The input hopper may provide cash insertion functions for the hybrid cash recycler 300. The input hopper 330 may have a maximum capacity of banknotes that may be simultaneously inserted. For example, the capacity may be 300 banknotes. According various embodiments, the hybrid cash recycler 300 may receive deposits larger than a maximum capacity by feeding additional banknotes into the input hopper 330 after the initial deposit has been received. The input hopper 330 may have a maximum speed at which the banknotes are read by the input hopper 330. For example, the speed may be 10 notes per second. In some embodiments, the input hopper 330 may have additional capabilities, such as scanning and verification of the inserted banknotes.

One or more cassettes 340 may be employed by the hybrid cash recycler 300 as storage for any overflow, or excess, of deposited banknotes. For example, the hybrid cash recycler 300 may not be capable of storing deposited banknotes in the roller storage modules 350 (e.g., storage is full). Accordingly, the hybrid cash recycler 300 may transfer any additional deposits received by the input hopper 330 to the cassettes 340 for storage. In some embodiments, the cassettes 340 may be specified for the storage of banknotes of a particular denomination. Alternatively, the cassettes 340 may be assigned to receive, and subsequently hold, any banknotes rejected by the input hopper 330 or banknote verification module 360 (e.g., counterfeit, damaged, unverified).

One or more rolled storage modules (RSM) 350 may be included. The RSM 350 may be employed by the hybrid cash recycler 300 for the storage and organization of deposited banknotes. Specifically, the RSM 350 may function to receive banknotes from the input hopper 330 and/or the banknote verification module 360, and roll the notes up on a mechanical drum inside of the storage module. According to exemplary embodiments, the hybrid cash recycler 300 may include any number of RSM 350 necessary to securely store the volume of cash handled by the associated financial institution, such as a bank branch. Accordingly, the number of RSM 350 may have a maximum, for example 10 RSM 350. Furthermore, each of the RSM 350 may have a maximum storage capacity, for example 600 banknotes per module.

In an embodiment, each of the RSM 350 may be assigned to store a single denomination of banknotes respectively. According to another embodiment, each of the RSM 350 may be configured for multi-denomination storage. For example, a module may accept and hold more than one denomination of banknotes, such as $1, $10, and $50 notes. It should be appreciated that the hybrid cash recycler 350 may employ any combination of single denomination and/or multi-denomination configurations for the RSM 350. It should also be appreciated that the RSM 350 may be alternatively implemented as other conventional cash handling storage mechanisms, such as stacking cassettes or stackers.

The banknote verification module 360 may be configured to verify or otherwise validate the banknotes received by the hybrid cash recycler 300. The banknote verification module 360 may operate to scan each banknote deposited in the input hopper 330 and transferred to the module for validation. Scanning mechanisms that are capable of reading, or detecting, information from banknotes may be employed by the banknote verification module 360. One or more scanning mechanisms that may be included in the banknote verification module 360 include, but are not limited to, infrared sensors, ultraviolet sensors, magnetic sensors, and visible light sensors.

In exemplary embodiments, the banknote verification module 360 may process the scanned information, or may send scanned information to the processor 315, to determine whether each banknote is verified or unverified. Accordingly, the banknote verification module 360 may reject banknotes (i.e., unverified) that may be detected as counterfeit, damaged, unfit, or unrecognizable, for example. The banknote verification module 360 may transfer verified banknotes to the cassettes 340 and/or the RSM 350. In an embodiment, the banknote verification module 360 may dispense rejected banknotes using the output hopper 320. In some embodiments, the banknote verification module 360 may have additional capabilities, such as banknote serial number recognition, denomination recognition, and foreign currency recognition.

In an embodiment, the hybrid cash recycler 300 may include at least one wireless network interface 370, such as a wireless transceiver, that may be utilized for providing short-range wireless communications, long-range wireless communications, or any combination thereof. The wireless network interface 370 may be implemented using any suitable component or device that may wirelessly transmit and/or receive audio and/or data signals, including analog and digital signals. The wireless network interface 370 may communicatively couple to a network. The network may be a computer based network, with one or more servers and/or computer processors. For example, the network may be the Internet or a network connected to the Internet. The network may be a cellular-based network. Information and data may be exchanged through the network between the various devices. It should be appreciated that the network may be a combination of local area networks, wide area networks, and external networks, which may be connected to the Internet.

The wireless network interface 370 may expand the communication and/or control capabilities of the hybrid cash recycler 300 by providing mechanisms to connect to a plurality of teller workstations, such as the teller workstations 130 depicted in FIG. 1. Therefore, exemplary embodiments may allow the hybrid cash recycler 300 to receive transaction requests from teller workstations remotely located from the hybrid device, for example on "the floor" of the bank branch. The wireless network interface 370 configurations may support various wireless signals that may include, but not be limited to, Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet Protocols (TCP/IP), or other protocols and/or systems suitable for transmitting and receiving data. For example, the wireless protocols can include IEEE 802.11a, 802.11b, 802.11g, and 802.11n. The wireless network interface 370 may be used for conducting wireless communications between multiple teller workstations over a wireless network.

In some embodiments, the hybrid cash recycler 300 may employ the wireless network interface 370 to communicate with the multiple teller workstations. The workstation may establish communications with the hybrid cash recycler 300. Upon successful initiation of communications between the workstation and the hybrid cash recycler 300, data may be exchanged between the workstation and the hybrid cash recycler. Data may be transmitted from the workstation to the hybrid cash recycler. Data may be transmitted from the hybrid cash recycler to the workstation. For example, the hybrid cash recycler may be used to perform several cash handling functions such as cash deposits, cash withdrawals, and the like. The workstation may be associated with a financial institution, such as the financial institution 120. The hybrid cash recycler 300 may be able to support conducting simultaneous transactions (i.e., transaction queuing) with multiple workstations and other devices via the wireless connectivity.

In an embodiment, the hybrid cash recycler 300 may include a transaction queue module 380. According to an embodiment, the transaction queue module 380 may provide instructions for queuing a plurality of transaction requests that are wirelessly transmitted from one or more teller workstations 130 and/or the bank server 150. The transaction queue module 380 may queue the transaction requests in the same order received, for example according to First-In-First-Out (FIFO) mechanisms.

Alternatively, the transaction queue module 380 may queue the transaction requests opposite of the ordered received, for example according to Last-In-First-Out (LIFO) mechanisms. In another embodiment, the transaction queue module 380 may further arrange the transaction requests to be queued, and subsequently transmitted, in an order which corresponds to a priority assigned to each transaction request.

The transaction queue module 380 may further include the data structures, memory, or employ the hybrid cash recycler memory 325 in order to store or otherwise maintain the queued transaction requests. In an embodiment, the transaction queue module 380 may possess the ability to process instructions for queuing and performing the transaction requests. In some embodiments, the transaction queue module 380 may employ the processor 315 in order to perform the cash handling operation indicated by the transaction requests.

The transaction queue module 380 may store multiple attributes associated with the one or more received transaction requests. The transaction request attributes may include, but are not limited to, the transaction type (e.g., withdrawal, deposit, etc.), denominations (e.g., $1, $5, $20, etc.), cash amount, teller ID, location, time, transaction request identifier, and the like. In an embodiment, the transaction queue module may store one or more authentication codes associated with each queued transaction request. The transaction queue module 380 may store the transaction request identifier, and the authentication code, in the same, or related, memory address location as the particular queued transaction request for which they correspond. The transaction queue module 380 may process instructions for displaying, or otherwise presenting to a user, the queue information via the input/output devices 310. The queue information displayed by the transaction queue module 380 may be presented as a list, icons, etc. that represent the arranged order of transaction requests in the queue. The queue information presented by the transaction queue module 380 may include the transaction request identifiers, attributes of queued transaction requests, and the like. The transaction queue module 380 may not display, or otherwise reveal the authentication code.

It should also be appreciated that the above mentioned functions and mechanisms of the transaction queue module 380 may be alternatively implemented by the bank server 150.

The hybrid cash recycler 300 may include an authentication module 390. The authentication module 390 may support various authentication or log-on systems and interaction. For example, these methods and systems may include entering a password or Personal Identification Number (PIN) or using a card to log-on, either via swiping the card through a reader, such as a magnetic strip reader or a smart chip reader, or through a radio frequency system which may require that the card be placed in proximity to an appropriate reader (i.e., a contactless system), including Radio Frequency Identification (RFID) and/or Near Field Communications (NFC). The reader may be implemented as one or more of the of I/O devices 310. Further, the use of the card is exemplary only and the card may include fobs, stickers, and other devices. Biometrics may be used, such as fingerprints, facial recognition, speech recognition, or retinal scan. A biometric reader may be incorporated into the hybrid cash recycler 300 in an appropriate location. A combination of these systems may be used. The hybrid cash recycler 300 may have other components. These components may include various data collection and support systems used by the financial institution to carry out a variety of functions.

In an exemplary embodiment, the authentication 390 may receive the entered authentication information as an authentication code. The authentication code may correspond to a particular teller workstation, such as teller workstation 140 from FIG. 1, or a financial institution employee, that generated a transaction request. Alternatively, the authentication code may correspond to a specific transaction request. The authentication module 390 may prompt a user to input an authentication code prior to completion of a cash handling operation associated with a transaction request.

According to an embodiment, the transaction queue module 380 may hold a queued transaction request until a user enters the authentication data. For example, a 4-digit PIN may be entered via the authentication module 390. The authentication module 390 may process instructions to determine that that received authentication code matches the stored authentication code for the corresponding transaction request identifier. In some embodiments, the authentication module 390 may employ the processor 315. Thereafter, the hybrid cash recycler 300 may perform the requested transaction, such as dispensing cash.

A processor 315 may be configured to control the functions of the hybrid cash recycler 300. The processor 315 may execute software, firmware, and computer readable instructions stored in memory 325, such that the capabilities of the hybrid cash recycler 300 are implemented according to exemplary embodiments. Memory 325 may include non-volatile and/or volatile memory.

The local interface 305 may be employed to commutatively couple the internal hardware and software components of the hybrid cash recycler 300. The local interface 305 can be, for example but not limited to, one or more buses or other wired or wireless connections, as is known in the art.

Figure 4A:
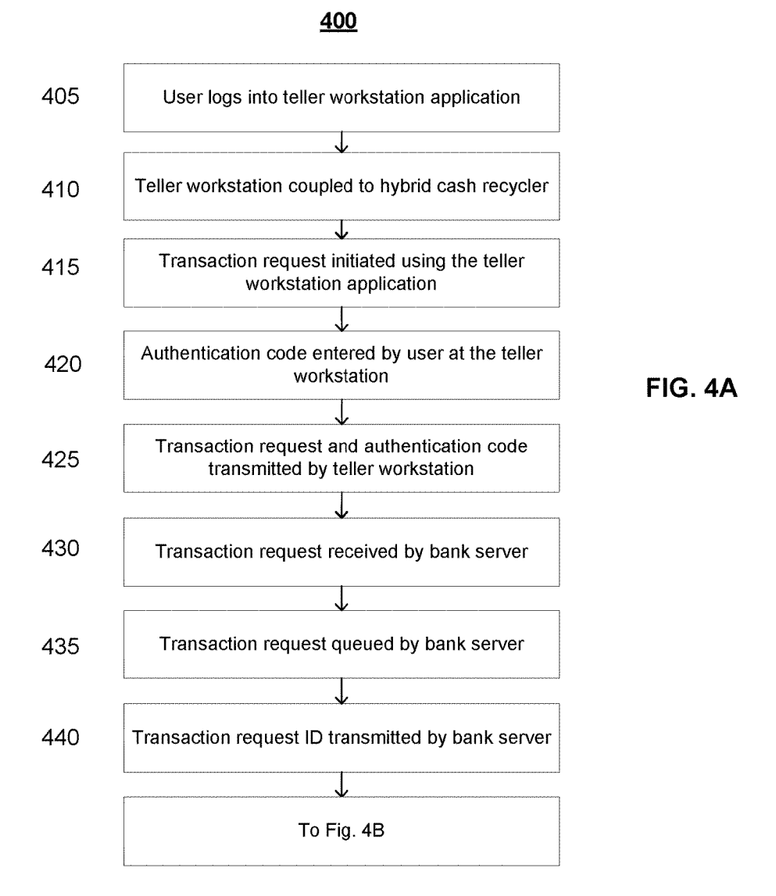
FIGS. 4A-4B together depict a flow chart of a method of using a hybrid cash recycler in accordance with an exemplary embodiment.
Figure 4B:
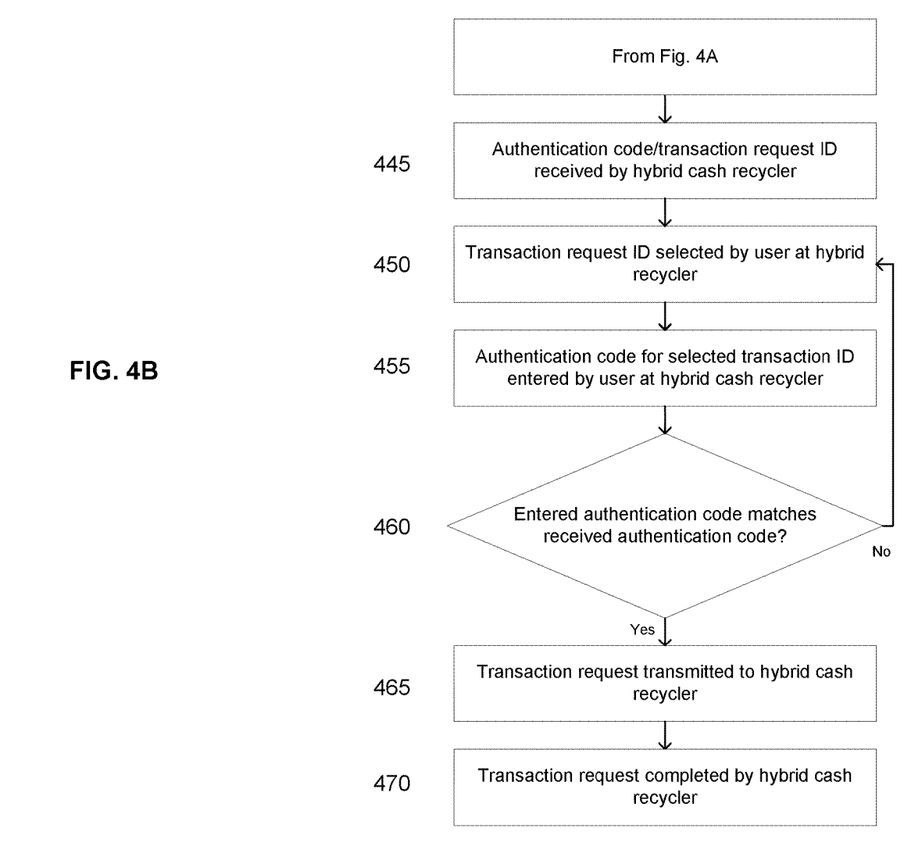

FIGS. 4A-4B depict a flow chart of a method employed for conducting one or more cash handling transactions using a hybrid cash recycler according to exemplary embodiments. The method 400 as shown in FIGS. 4A-4B may be executed or otherwise performed by one or a combination of various systems and devices, such as the system of FIG. 1.

At block 405, in FIG. 4A, a user may log in to a teller workstation application. Prior to log-in, an application, such as Teller Express, may be started at the workstation application. The application may facilitate communication and/or control of a hybrid cash recycler, according to various embodiments. The teller workstation may be a portable computing device or a non-portable computing device. In some embodiments, the starting may not be required as the application may be the only application on the computing device. Thus, in those embodiments, starting the application may be optional.

Logging in to the teller workstation may involve a process. The log-in process may ensure that only authorized users may access the application. The log-in process may be combined with a login to the computing device, or teller workstation, itself; that is a user may log in to the computing device and be granted access to the application. The login may be conducted using any number of methods. For example, biometrics or a username/password may be used. A combination of login methods may be used. For example, biometrics and an entry code may be required.

At block 410, the teller workstation may be coupled to a hybrid cash recycler. The teller workstation may be wirelessly coupled to the hybrid cash recycler. For example, the teller workstation may establish a wireless connection to a communications network, such as a wireless LAN, provided by the financial institution.

At block 415, a transaction request may be initiated using the teller workstation application. A graphical user interface (GUI) may be generated by the application, and subsequently displayed on a screen of the teller workstation. The GUI may allow various user inputs to be received for one or more desired cash handling transactions. The transaction request may be associated with any cash handling task that is capable of being performed by the hybrid cash recycler including, but not limited to cash withdrawals and cash deposits. The GUI may present one or more options to the user regarding the transaction request. Each option may be represented by an icon and/or text describing the transaction request. For instance, a teller may select an option for a cash withdrawal request to be transmitted to, and performed by, the hybrid cash recycler. The application may prompt a user for additional input associated with the transaction request, such as the specific amount of cash to be dispensed (e.g., $1,000), and the desired denominations (e.g., $100 notes).

At block 420, an authentication code may be entered by a user at the teller workstation, through an application. The teller workstation application may prompt the user to enter an authentication code, for example, a 4-digit PIN, to be associated with the initiated transaction request. The user may enter the authentication code via one or more input devices coupled to the teller workstation, such as a keyboard, touchscreen, or biometric reader. As an example, a user may enter an authentication code of "1234" at a prompt window for the initiated transaction request (e.g., withdraw $1,000).

In block 425, the initiated transaction request and the authentication code may be transmitted by the teller workstation. The teller workstation may transmit the information wirelessly over the communications network, for example.

At block 430, the transaction request and the authentication code may be received by the bank server. The bank server may receive the information wirelessly over the communications network from the teller workstation application. The transaction request may include the user designated transaction, and additional transaction selections. In an embodiment where multiple hybrid cash recyclers is employed in the same area, the transaction request may optionally include an indication of a selected hybrid cash recycler to perform the cash handling transaction. In response to receiving the transaction request and the authentication code, the bank sever may optionally return an acknowledgement to the teller workstation application. In an embodiment, the authentication code may be encrypted according to well-known methods, prior to transmission.

At block 435, the transaction request may be queued by the bank server. The bank server may queue the transaction request by maintaining the received information in a storage, memory, or data structure. Specifically, the bank server may append the received transaction request to the end of a FIFO queuing mechanism. In some embodiments, the received transaction request may be placed at the start of a LIFO queuing mechanism. The queue may have stored therein one or more previously received transaction requests. The bank server may appropriately rearrange the transaction queue, as other transaction requests become completed and removed from the queue. In the event that the received transaction request is the only transaction request for a hybrid cash recycler, the bank server may optionally transmit the transaction request to the designated hybrid cash recycler without queuing. The additional transaction requests may be initiated from any of a plurality of teller workstations that may be communicatively coupled to bank server and/or hybrid cash recycler.

At block 440, the bank server may transmit the authentication code and a transaction request identifier (ID). The bank server may transmit the information wirelessly over the communications network, for example. In various embodiments, the bank server may transmit the transaction request ID when the transaction request has been moved to the front of the queue, and determined to be next for processing. The transaction request ID may be transmitted by the bank server, while the transaction request code/instructions are held by the queue. The entire transaction request, including the executable code/instructions, may be fully retrieved from the queue, and transmitted, upon completion of a successful authentication at the hybrid cash recycler. In some embodiments, the bank server may transmit multiple transaction request IDs and authentication codes simultaneously, to support the efficient use of network bandwidth.

In block 445, in FIG. 4B, the hybrid cash recycler may receive the authentication code and the transaction request ID. The hybrid cash recycler may receive the information wirelessly over the communications network from the bank server. Thereafter, the hybrid cash recycler may display, or otherwise present, the received transaction ID to be viewed by the user when in close physical proximity to the device. For instance, the same user that remotely initiated the transaction request may view the transaction request ID displayed on a touchscreen of the hybrid cash recycler. The authentication code may not be displayed by the hybrid cash recycler, so to prevent the authentication code from being intercepted by an unauthorized user.

At block 450, the transaction request ID may be selected by the user at the hybrid cash recycler. In an embodiment, the hybrid cash recycler may display multiple transaction request IDs. Each transaction request ID may correspond to a different transaction request. Accordingly, each transaction request may have been initiated by any one of multiple teller workstations connected wirelessly to the hybrid cash recycler. Therefore, the user may select the one or more transaction request IDs that correspond to the transaction requests they initiated. For example, a user may have generated a transaction request for a withdrawal of $1,000. The transaction request may be assigned the transaction ID of "W1000." Accordingly, at the user hybrid cash recycler, the user may select "W1000" from the displayed transaction IDs. The user selection may be provided with an input device that is connected to, or otherwise integrated into, the hybrid cash recycler, such as a touchscreen.

At block 455, the authentication code for the selected transaction ID may be entered by the user at the hybrid cash recycler. In some embodiments, the user that entered the authentication code at the teller workstation, should be the only user with knowledge of, or access to, the authentication code. Thus, the user is authenticated once they are physically present at the hybrid cash recycler. The user may enter the authentication code via one or more input devices coupled to the hybrid cash recycler, such as a keypad, touchscreen, or biometric reader. As an example, a user may enter an authentication code of "1234" that corresponds to the transaction request ID "W1000."

At block 460, the hybrid cash recycler may determine whether the authentication code entered by the user matches the received authentication code that is transmitted with the transaction ID. Consequently, the authentication code communicated via the network must be the same as the authentication code known by the user. The determination may be accomplished by employing the processor of the hybrid cash recycler. In the instance where the authentication codes match (i.e., "Yes"), a successful authentication may be accomplished and the method proceeds to step 465.

In the event that the authentication codes do not match (i.e., "No"), then an unsuccessful authentication may be determined by the hybrid cash recycler. The method may return to step 450, and a user must once again select a transaction request ID or the method may return to step 455 for re-entry of the authentication code. In some embodiments, the method may go through a maximum number of iterations, where each iteration provides the user with another attempt to re-enter the authentication code. If the maximum number of iterations have been reached without successful authentication, then the hybrid cash recycler may perform one or more error functions that may include deleting the transaction request ID, sending an error message to the teller workstation, displaying an error message at the hybrid cash recycler, and the like. In some embodiments, failure to enter the correct authentication code may cause the hybrid cash recycler to enter into a lock cycle such that the device may not be used. An alarm or other audio and/or visual indicator may sound to provide an alert to the problem.

In block 465, once the authentication code is determined to produce a positive match, acknowledgement of the successful authentication may be transmitted to the bank server. In response to the received acknowledgment, the bank server may transmit the transaction request in its entirety, including the executable code/instructions to the hybrid cash recycler.

At block 470, the hybrid cash recycler may complete the transaction request. The hybrid cash recycler may process or otherwise execute the code/instructions of the transaction request to complete the corresponding automated cash handling. For example, the transaction request for a withdrawal of $1,000 may cause the hybrid cash recycler to dispense $1,000 in cash. In an embodiment, the user may physically return to the teller workstation to finalize the transaction via the teller workstation application. Transaction finalization provides a user confirmation that the hybrid cash recycler performed the cash handling activity without error. According to exemplary embodiments, if the hybrid cash recycler conducts an error, for example, dispensing $100 instead of the requested $1,000, the user may re-initiate the transaction request.

Hereinafter, physical aspects of implementation of the exemplary embodiments will be described. As described above, exemplary methods may be computer implemented as a system. The system or portions of the system may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not.

As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of, or in addition to, the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe, for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, for example, capable of implementing the steps of the process.

It is appreciated that in order to practice the methods as described above, it is not necessary that the processors and/or the memories of the processing machine be physically located in the same geographical place. For example, each of the processors and the memories and the data stores used may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with further embodiments, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions. It is also appreciated that the data storage performed by two distinct components as described above may, in accordance with a further embodiment, be performed by a single component. Further, the data storage performed by one distinct component as described above may be performed by two distinct components.

Further, various technologies may be used to provide communication between the various processors and/or memories, as well as to allow the processors and/or the memories of the various embodiments to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of various embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the various embodiments may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, REXX, Ruby, Visual Basic, X10, and/or JavaScript, for example. Further, it is not necessary that a single type of instructions or single programming language be utilized in conjunction with the operation of the system and method of various embodiments. Rather, any number of different programming languages may be utilized as is necessary or desirable.

Also, the instructions and/or data used in the practice of the various embodiments may utilize any compression or encryption technique or algorithm, as may be desired. An encryption module might be used to encrypt data. Further, files or other data may be decrypted using a suitable decryption module, for example.

As described above, various embodiments may illustratively be embodied in the form of a processing machine, including a computer or computer system, for example, that includes at least one memory. It is to be appreciated that the set of instructions, e.g., the software, for example, that enables the computer operating system to perform the operations described above, may be contained on any of a wide variety of computer readable media, as desired. Further, the data, for example, processed by the set of instructions might also be contained on any of a wide variety of media or medium. For example, the particular medium, e.g., the memory in the processing machine, utilized to hold the set of instructions and/or the data used, may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the system.

Further, the memory or memories used in the processing machine that implements the various embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the various embodiments, a variety of "user interfaces" may be utilized to allow a user to interface with the processing machine or machines that are used to implement various embodiments. As used herein, a user interface includes any hardware, software, or combination of hardware and software used by the processing machine that allows a user to interact with the processing machine. A user interface may be in the form of a dialogue screen, for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is contemplated that the user interface might interact, e.g., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

While the various embodiments have been particularly shown and described within the framework of financial services devices including TCR devices, it will be appreciated that variations and modifications may be effected by a person of ordinary skill in the art without departing from the scope of the various embodiments. Furthermore, one of ordinary skill in the art will recognize that such processes and systems do not need to be restricted to the specific embodiments described herein. Other embodiments, combinations of the present embodiments, and uses and advantages will be apparent to those skilled in the art from consideration of the specification and practice of the various embodiments disclosed herein. The specification and examples should be considered exemplary.

Accordingly, while the various embodiments are described here in detail in relation to the exemplary embodiments, it is to be understood that this disclosure is only illustrative and exemplary and is made to provide an enabling disclosure. Accordingly, the foregoing disclosure is not intended to be construed or to limit the various embodiments or otherwise, to exclude any other such embodiments, adaptations, variations, modifications, and equivalent arrangements.

What is claimed is:

1. A system, comprising:
a wireless communications network;
a workstation computing device, comprising at least one computer processor, a memory, and an input device, communicatively coupled to the wireless communications network;
a server, comprising at least one computer processor and a memory, communicatively coupled to the wireless communications network; and
an automated cash handling device, comprising at least one computer processor, a memory, at least one input device, a display, a wireless interface, and one or more cash handling components, communicatively coupled to the wireless communications network;
wherein the workstation computing device is configured to execute software configured to:
  receive input to initiate a new transaction request;
  generate a new transaction request and an authentication code unique to the new transaction request; and
  transmit to the server the new transaction request and the associated authentication code;
wherein the server executes software configured to:
  receive a new transaction request and an associated authentication code;
  add the new transaction request to a server queue;
  generate a transaction identifier (ID) associated with the new transaction request;

transmit to the automated cash handling device the transaction ID and the associated authentication code;

receive from the automated cash handling device a transaction ID selection and a message indicating successful authentication; and transmit to the automated cash handling device the transaction request associated with the selected transaction ID;

wherein the automated cash handling device is configured to execute software configured to:

receive from the server the transaction ID and an associated authentication code;

add the transaction ID to a device queue;

display one or more transaction IDs from the device queue;

receive input comprising a transaction ID selection and an authentication input;

verify that the authentication input matches the authentication code associated with the transaction ID selection;

transmit to the server the transaction ID selection and a message indicating successful authentication if the authentication input is verified;

receive from the server the transaction request associated with the transaction ID selection;

perform the received transaction request using the one or more cash handling components.

2. The system of claim 1, wherein the automated cash handling device is a cash recycler.

3. The system of claim 1, wherein the new transaction request comprises one of: a cash deposit, a cash withdrawal, a cash exchange, a cash sorting, and a cash counting.

4. An apparatus, comprising:
at least one computer processor;
a memory;
a display;
at least one input device;
a wireless interface communicatively coupled to a wireless communications network; and
one or more cash handling components;
wherein the apparatus is configured to execute software configured to:
receive from a server via the wireless communications network one or more transaction identifiers (IDs) and a unique authentication code associated with each of the one or more transaction IDs;
add the one or more transaction IDs to an apparatus queue;
display one or more transaction IDs from the apparatus queue;
receive input comprising a transaction ID selection and an authentication input;
verify that the authentication input matches the authentication code associated with the transaction ID selection;
transmit to the server via the wireless communications network the transaction ID selection and a message indicating successful authentication if the authentication input is verified;
receive from the server a transaction request associated with the transaction ID selection;
perform the transaction request using the one or more cash handling components.

5. The apparatus of claim 4, wherein the transaction request comprises one of: a cash deposit, a cash withdrawal, a cash exchange, cash sorting, and cash counting.

6. The apparatus of claim 4, wherein the authentication input is entered using at least one of: a display screen, a keypad, a card reader, a Radio Frequency Identification (RFID) sensor, and Near Field Communications (NFC) sensor.

7. A method, comprising:
initiating, by a workstation computing device, one or more transaction requests;
generating, by the workstation computing device, a unique authentication code for each of the one or more transaction requests;
transmitting, from the workstation computing device to a server, the one or more transaction requests and the associated authentication codes via a wireless communications network;
adding, by the server, the one or more transaction requests to a server queue;
generating, by the server, a unique transaction identifier (ID) for each of the one or more transaction requests;
transmitting, from the server to a cash handling device, the one or more unique transaction IDs and the associated authentication codes via the wireless communications network;
adding, by the cash handling device, the one or more transaction IDs to a device queue;
displaying, by the cash handling device, one or more transaction IDs from the device queue;
receiving, by the cash handling device, a transaction ID selection and an authentication input via at least one input device;
verifying, by the cash handling device, that the authentication input matches the authentication code associated with the transaction ID selection;
transmitting, from the cash handling device to the server, the transaction ID selection and a message indicating successful authentication if the authentication input is verified;
transmitting, from the server to the cash handling device, the transaction request associated with the transaction ID selection; and
performing, by the cash handling device, the transaction request using one or more cash handling components.

8. The method of claim 7, wherein the authentication input is entered using at least one of: a display screen, a keypad, a card reader, a Radio Frequency Identification (RFID) sensor, and Near Field Communications (NFC) sensor.

9. The method of claim 7, wherein each authentication code is generated based on user input at the workstation computing device.

10. The method of claim 7, wherein the one or more transaction requests comprise at least one of: a cash deposit, a cash withdrawal, a cash exchange, cash sorting, and cash counting.

* * * * *